Oct. 6, 1931.  G. F. RAPPICH  1,826,480
CAMPING TRAILER
Filed June 28, 1928   2 Sheets-Sheet 1

Inventor
George F. Rappich
By
Wilson & McCanna
Attys.

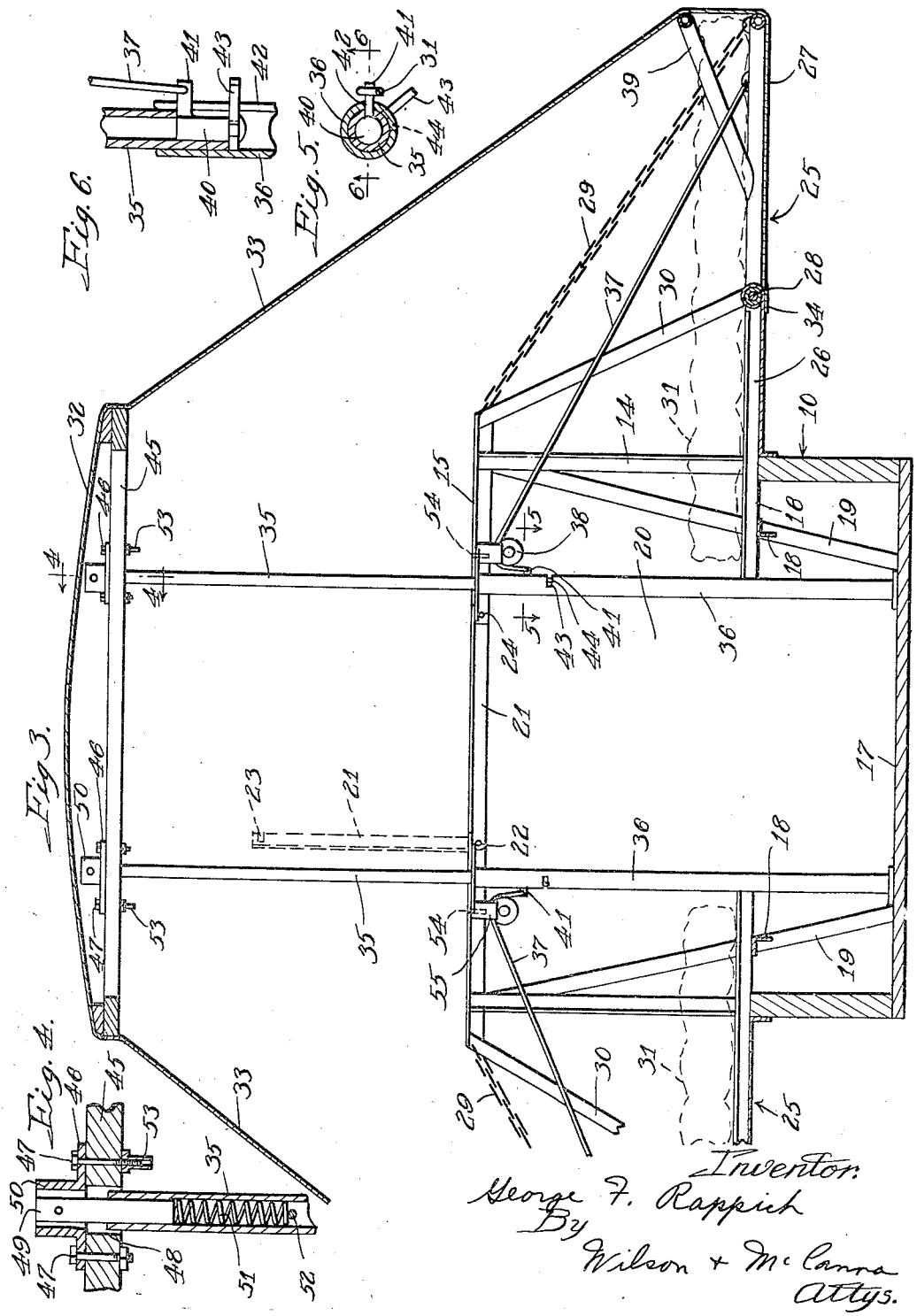

Patented Oct. 6, 1931

1,826,480

UNITED STATES PATENT OFFICE

GEORGE F. RAPPICH, OF MARENGO, ILLINOIS

CAMPING TRAILER

Application filed June 28, 1928. Serial No. 288,843.

This invention relates to camping trailers.

The principal object of the present invention is to provide a trailer which, while it is designed to afford ample and thoroughly sheltered sleeping quarters for four persons when unfolded and set up for that purpose, is designed to fold up or jack-knife to an extremely compact, low-slung form such that the trailer is not top heavy and does not constitute an obstruction to vision to the rear from the automobile pulling the same, both of the objections mentioned being noteworthy as regards camping trailers heretofore devised.

Among the features incorporated in my improved trailer may be enumerated the following:

(1) The provision of a body having a double folding bed mounted on each side thereof, thus affording sleeping quarters for four persons as well as adequate dressing-room space.

(2) The provision of a top for the trailer body arranged to be automatically raised and lowered in the unfolding and folding of the bed, thus affording a trailer low enough when folded for travel so as not to obstruct vision to the rear from the car ahead.

(3) The provision of awnings connected with opposite sides of the top and arranged in the unfolding of the beds and the accompanying raising of the top to be stretched neatly over the beds to serve as shelters therefor, the front and rear ends of the body being likewise enclosed for complete protection from the weather.

(4) The provision in the mounting for the top of rods telescoping in tubular guides provided in the body and having means for quickly detachably securing the same in extended position to make the top thoroughly secure; also the provision in the connection between the rods and the top of spring cushioning means affording sufficient give in the structure to allow for shrinkage of the canvas awnings in service, such that the same may always be taut without danger of tearing.

The invention is illustrated in the accompanying drawings, wherein—

Fig. 3 is a transverse section looking to the rear showing the beds unfolded and the top raised;

Figure 1:
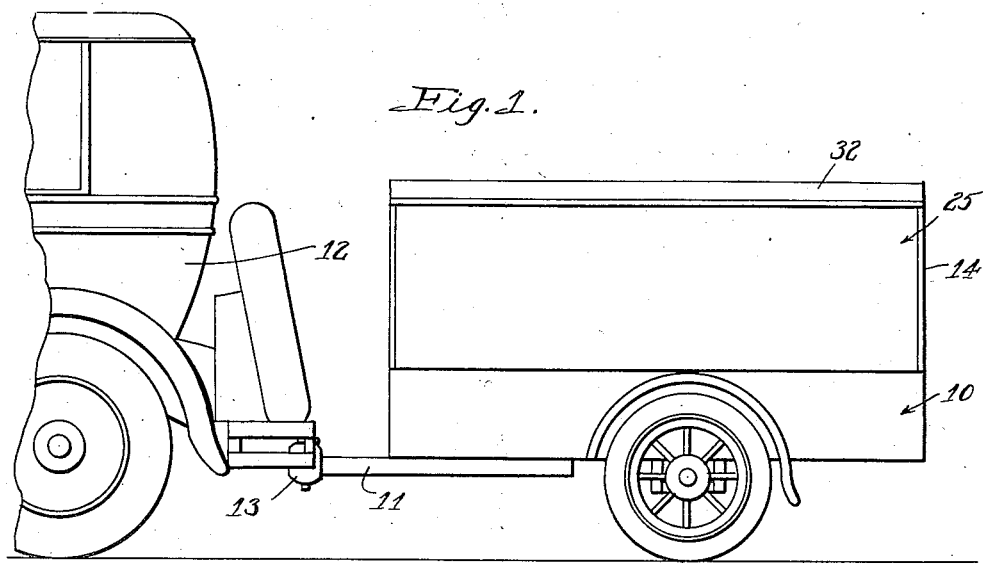
Figure 1 is a side view of my improved trailer folded up for travel and shown coupled to an automobile in the usual way.

Fig. 4 is an enlarged sectional detail of the spring cushion mounting for the top taken at right angles to the plane of the line 4—4 of Fig. 3; and Figs. 5 and 6 are enlarged sectional details of the means for quickly detachably locking the top supporting rods in extended position, Fig. 5 being a horizontal section on the line 5—5 of Fig. 3 and Fig. 6 being a vertical section on the line 6—6 of Fig. 5.

The same reference numerals are applied to corresponding parts throughout the views.

My invention, as will have been gathered from the foregoing, is particularly concerned with improvements in the design and construction of the body 10 of the trailer illustrated. While the one shown happens to be of the two-wheel type, it will be evident that the invention might be embodied in a four-wheel type with equal facility. The shaft 11 of the trailer is shown coupled to the back of the car 12 as at 13. Any suitable form of universal coupling may be employed.

The body 10, according to my invention, has the frame thereof built fairly low, angle irons being employed as at 14 to serve as uprights, and at 15 and 16 to serve as upper and lower cross-members. The latter are at about standard height relative to the floor 17 to serve as bed rail members, as will presently appear. The front and rear cross-members may be interconnected by longitudinal members 18 for rigidity, and braces 19 are suitably provided at the rear extending between the uprights 14 and the floor 17 on opposite sides of the door opening 20, it being evident that the cross-members 15 and 16, or at least the cross-member 16, should not be allowed to extend across at this point. The intermediate section 21 of the upper cross-member 15 at the rear of the body is suitably pivoted at one end as at 22 and has a slot 23 in the other end thereof to receive a pin 24 to interlock the sides of the body and minimize any likelihood of sagging when the folding double beds, indicated at 25, are occupied. The inner section 26 of each bed is mounted on the side of the body 10 and also supported by the longitudinal frame member 18. The outer section 27 of each bed is pivoted to the inner section, as at 28, and is arranged to be swung from the folded position shown in Fig. 2 to the unfolded position shown in Fig. 3. Chains 29, or other flexible means, are provided at opposite ends of each of the beds 25 extending between the frame of the body and the outer edge of each of the sections 27 to provide proper support. The frame of the body 10 also has diagonal members 30 extending from the pivots 28 at the opposite ends of the two beds to the upper cross-members 15 further to insure ample support. The sections 26 and 27 have any suitable form of springs thereon on which the folding mattresses 31 are arranged to be laid. It will be evident from the foregoing description that the trailer affords sleeping quarters for four persons; in other words, it accommodates all of those who can be seated in the car 12 and amounts to a portable hotel. The space between the double beds provides adequate dressing room. A door (not shown) will, of course, be provided for the opening 20 reaching as high as the upper cross-member 15, and a covering of canvas, or other suitable material, is provided for both ends of the trailer as well as for the top, as will presently appear. In entering or leaving the trailer, it will be evident that the swinging section 21 can be raised and lowered without inconvenience. This part may, however, be dispensed with providing the rest of the frame-work is made sturdy enough so as not to sag under the load imposed when the two double beds are occupied.

Figure 2:
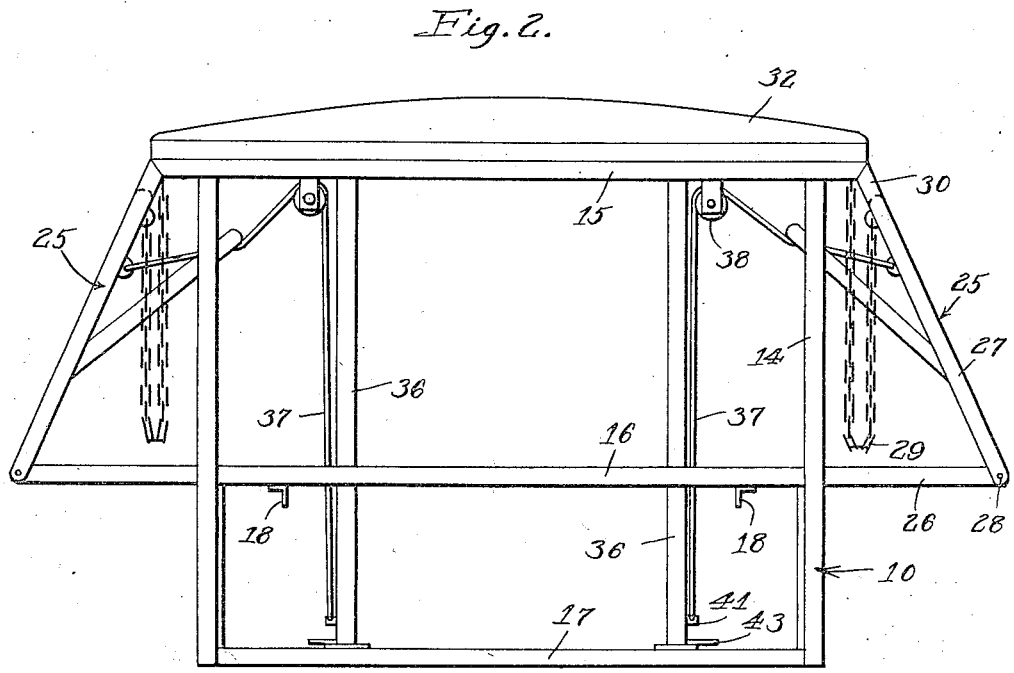
Fig. 2 is a front view of the body of the trailer with the front covering removed to disclose the novel construction and arrangement.

The top 32 for the trailer is arranged to be raised from the position shown in Figs. 1 and 2 to the position shown in Fig. 3 and has awnings 33 fastened to the sides thereof to serve as shelters for the beds 25. If desired, the awnings 33 may be provided in one continuous length reaching over the top 32 from one side of the trailer to the other. The free ends of the awnings 33 are attached, as indicated at 34, underneath the beds 25. Rods 35 telescoping in tubular posts or guides 36 are arranged to support the top in raised position, as shown in Fig. 3, two such rods being suitably employed at each end of the body 10, although, of course, additional rods might be employed at intermediate points if desired. Each of the rods 35 has a cable or other flexible element 37 attached to the lower end thereof and extending over a pulley 38 and connected to the swingable section 27 of one of the folding beds 25, the object being to extend the rods 35 from their guides 36 automatically in the unfolding of the beds 25 so as to raise the top 32. Thus, two persons can easily open and close the trailer; they work from opposite sides and unfold or fold the beds simultaneously and accordingly raise or lower the top. The raising of the top causes the awnings 33 to be stretched neatly over the beds. The brackets 39 provided on the swingable sections 27 of the beds 25 hold the awnings out far enough so as not to be in the way for one lying on the outer half of either bed. In the lowering of the top which accompanies the folding of the beds it will be evident that the awnings 33 will be ballooned out by a breather or bellows action and there is accordingly no difficulty whatever by reason of the awning getting folded in between the beds and the body frame; as soon as the air has escaped from inside the canvas the awnings can be folded neatly and buckled, or otherwise suitably secured in place to present a neat appearance.

The rods 35 are preferably tubular and have brackets 40 mounted in the lower ends thereof providing radially extending arms 41 to which the cables 37 may be secured (see Fig. 6). The tubular guides 36 have longitudinally extending slots 42 in the walls thereof to receive the arms 41. A latch 43 is pivotally mounted on the lower end of each bracket 40 and is also received in the slot 42. A cross-slot 44 is provided in each tubular guide 36 intersecting the slot 42 near the upper end thereof and is arranged to receive the latch 43. Thus, when the rods 35 are extended to the position shown in Fig. 3, each of the latches 43 is then arranged to be swung into its slot 44 to make the top thoroughly secure in its raised position. These latches must, of course, be swung back to the slots 42 when the top is to be lowered again.

The rods 35 preferably have a yielding connection with the top 32, as will now be described, so as to allow for shrinkage of the canvas awnings in service, such that the same may be designed to be snug fitting without danger of tearing. Cross-pieces 45 on the top 32 are each associated with one pair of rods 35 and have plates 46 bolted thereto, as at 47, over holes 48 arranged to receive the upper ends of the rods 35. Posts 49 are mounted in hubs 50 provided on said plates and project downwardly through the holes 48 for reception in the upper ends of the rods 35. Springs 50 fitting on pins 52 are mounted in the upper ends of the rods 35 and bear against the lower ends of the posts 49. The springs 51 are placed under compression in the stretching of the awnings 33 in a manner believed to be self-evident and provide sufficient give in the structure to allow for a certain amount of shrinkage of the awnings in service.

I prefer to provide extension nuts 53 on some of the bolts 47 to serve in the nature of dowels arranged to enter sockets 54 provided therefor in the upper cross members 15, as, for example, in the brackets 55 for the pulleys 38. The cooperation of the dowels with their sockets insures freedom from side play for the top 32 when the latter is resting on the body, as shown in Figs. 1 and 2.

It is believed the foregoing description conveys a clear understanding of my invention and of its various objects and advantages. While reference has been made to certain specific details of construction and arrangement it should be evident that these are susceptible of wide variation. For that reason the appended claim has been drawn with a view to covering all legitimate modifications and adaptations of my invention, such as will no doubt appear to anyone skilled in the art to which the invention relates as a result of my disclosure.

I claim:

In a camping trailer, the combination of a body, hollow vertical posts on said body at opposite ends thereof, a raisable top for the body, top supporting rods telescoping in the posts, hinged sides for the body arranged to unfold outwardly to serve as mattress supports, there being suitable means for supporting the hinged sides from the body in unfolded position, pulleys adjacent the upper ends of the posts, flexible cables attached to the sides and extended over the pulleys and attached to the top supporting rods at the lower ends of the latter for raising the same in the posts in the unfolding of the sides whereby to automatically raise the top, means at the upper ends of the posts at a predetermined elevation for attaching the rods rigidly to the posts in raised position, the said rods being arranged to be raised to a predetermined elevation in the posts for the purposes of attachment thereto, and compressible spring means between the upper ends of the rods and the top permitting movement of the rods upwardly relative to the top for the attachment thereof, the said spring means being thereby compressed so as to place the canopy under a predetermined yielding tension.

In witness of the foregoing I affix my signature.

GEORGE F. RAPPICH.